United States Patent [19]

Veselica et al.

[11] Patent Number: 4,844,193
[45] Date of Patent: Jul. 4, 1989

[54] NOISE ABSORBER FOR DRIVE SHAFTS

[75] Inventors: Gary M. Veselica, Clarklake; Keith M. Miller, Hillsdale; Miguel SayGan, Oak Park, all of Mich.

[73] Assignee: Eagle-Picher Industries, Inc., Cincinnati, Ohio

[21] Appl. No.: 99,005

[22] Filed: Sep. 21, 1987

[51] Int. Cl.⁴ .......................... F01N 1/10; B60K 17/22
[52] U.S. Cl. ..................................... 464/180; 181/207; 181/246; 180/381
[58] Field of Search ........................ 180/71, 73.1, 75.2, 180/85, 88, 56, 76; 181/243, 200, 246, 207, 208, 252

[56] References Cited

U.S. PATENT DOCUMENTS

| | | | |
|---|---|---|---|
| 2,342,813 | 2/1944 | Mason | 181/207 |
| 2,877,860 | 3/1959 | Hoffar | 181/246 |
| 3,504,573 | 4/1970 | Yoshida | 180/75.2 |
| 3,800,909 | 4/1974 | Duncanson et al. | 181/207 |
| 4,207,957 | 6/1980 | Sivers et al. | 180/75.2 |
| 4,237,207 | 6/1981 | Sivers et al. | 180/75.2 |
| 4,331,214 | 5/1982 | Darby | 181/208 |
| 4,408,679 | 10/1983 | Littrell | 181/246 |

FOREIGN PATENT DOCUMENTS

| | | |
|---|---|---|
| 1525040 | 7/1969 | Fed. Rep. of Germany . |
| 49-20644 | 5/1974 | Japan . |
| 404153 | 1/1934 | United Kingdom . |
| 669019 | 3/1952 | United Kingdom . |
| 915093 | 1/1963 | United Kingdom . |
| 1462170 | 1/1977 | United Kingdom . |

Primary Examiner—Richard A. Bertsch
Attorney, Agent, or Firm—Wood, Herron & Evans

[57] ABSTRACT

A drive shaft has a noise absorber consisting of a rubber cup-shaped element inserted in the drive shaft and a plastic insert that presses the cup-shaped element against the interior wall against the drive shaft.

9 Claims, 1 Drawing Sheet

NOISE ABSORBER FOR DRIVE SHAFTS

This invention relates to a noise absorber for a drive shaft for an automotive vehicle.

Some hollow drive shafts, for example a four inch aluminum drive shaft, when vibrated as by being struck or subjected to an impulse force due to sudden clutch release will ring. The ringing noise is objectionable to many drivers.

Attempts have been made to eliminate a ringing noise. One such attempt has been to insert about a sixteen inch length of a cardboard roll so that it fits snugly in the center of the drive shaft. The cardboard roll is satisfactory from the standpoint of its weight, its expense and its noise absorption. However, under some conditions of humidity and temperature, after the cardboard roll has been installed, the roll shrinks and becomes loose. The loose roll will impart to the drive shaft a clicking or cracking noise with the result that, when it is objected to, the whole drive shaft has to be replaced.

Another attempt to solve the problem has been to provide a chunk of elastomer having a size of the order of a hockey puck, the puck-like element being jammed into the drive shaft. That solution provides a permanent attenuation of the noise but it is expensive and it is heavy. The heaviness tends to reduce the critical speed at which the drive shaft develops a bending whip so that that phenomenon is more likely to occur. Further the hockey puck-type element increases the amplitude of that bending whip with a consequent undesirable vibration.

An objective of the present invention has been to provide a noise absorber that is as effective as cardboard, that is as light as cardboard, and that is as inexpensive as cardboard but does not have the disadvantages of cardboard.

The objectives of the present invention are attained by fixing a thin elastomeric diaphragm transversely across the interior of the drive shaft.

More particularly, the sound absorber device is a cup-shaped rubber element having a rigid plastic insert that is held in position within the drive shaft by about a 0.020 inch interference fit at the location of the maximum amplitude of vibration. The drive shaft is closed at both ends by the yokes that are connected between the transmission and the differential. Thus, the drive shaft constitutes a closed hollow tube. Sound waves created by vibration at its resonant frequency are reflected back and forth to create a standing wave. It is believed that that standing wave will have the same form as a curve of vibration amplitudes measured by an accelerometer along the length of the drive shaft. It has been found that if the diaphragm is disposed across the interior of the drive shaft at approximately the location of the maximum amplitude of the standing wave, or maximum amplitude of the drive shaft vibrations, the greaest attenuation of the noise is obtained.

Certain drive shaft assembly processes, for example a magnaforming process for joining the yokes to the shaft, require that no contaminates be found in the area of joining the yoke to the shaft. Thus, it is unsatisfactory to use a lubricant to press a noise-absorbing device into the shaft. For this situation, it is preferred that the surface layer of the rubber cup be chlorinated by the well known process employed with the windshield wipers, for example, in order to reduce its coefficient to friction, and to enable the device to be inserted into the shaft with a force of no more than five hundred pounds.

The noise absorber of the present invention weighs less than cardboard (five ounces versus four ounces for the invention), it costs about the same, and it retains its position in the drive shaft once it has been inserted.

The several objectives and features of the present invention will become more readily apparent from the following detailed description taken in conjunction with the accompanying drawings in which.

Figure 1:
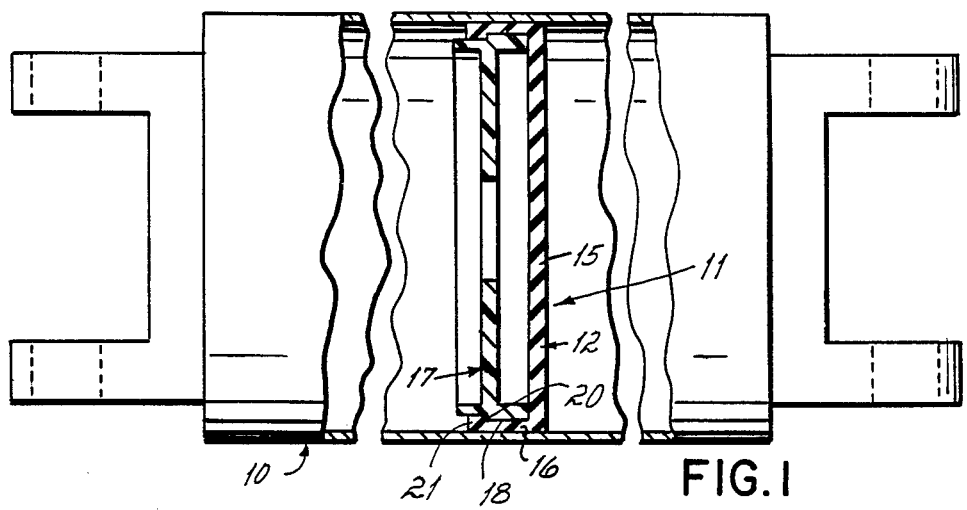
FIG. 1 is a longitudinal cross sectional view of a drive shaft with the noise absorber inserted in the drive shaft.

As shown in FIG. 1, a drive shaft 10 contains a noise suppressor 11. The noise suppressor includes a cup 12 formed of a resilient flexible styrene butadiene rubber. In the embodiment illustrated, the rubber is about 0.160 inch thick. It is inserted transversely across the interior of the drive shaft, the drive shaft having an inside diameter of four inches. The outside diameter of the cup is 4.020 inches thereby providing an interference fit of 0.020 inch.

The cup-shaped rubber element provides a diaphragm 15 and axially extending walls 16 forming a ring. A rigid plastic insert 17 presses against the inside surface 18 of the axial walls 16 to force the axial walls against the interior of the drive shaft thereby preventing the rubber cup element 12 from collapsing upon itself. The plastic insert has a circumferential shoulder 20. The axial walls 16 have a circumferential rim 21 that is inwardly directed and fits against the circumferential shoulder 20, thereby locking the plastic insert within the axial walls of the cup once the assembly of the noise absorber has been inserted in the drive shaft.

Conventional wisdom would suggest inserting the noise absorber into about the center of the drive shaft. However, it has been found that positioning the absorber adjacent either of the ends of the drive shaft provides a greater attenuation of the noise.

Figure 2:
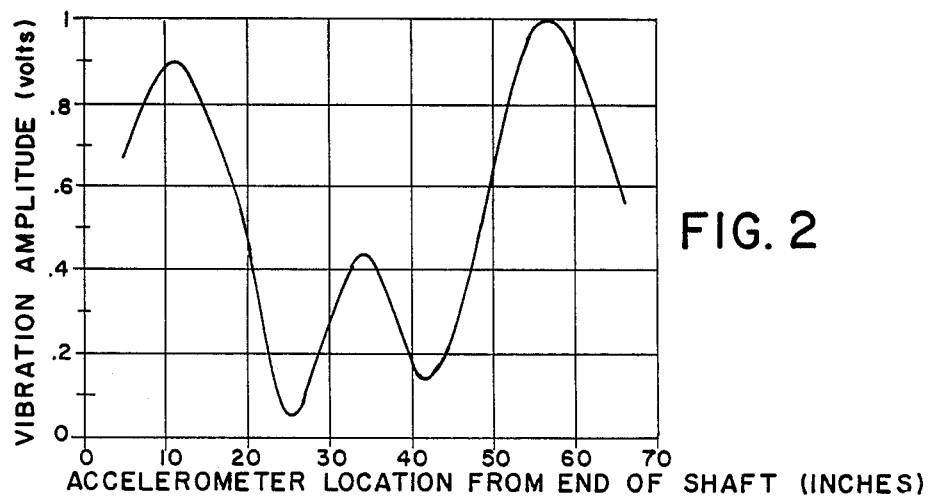
FIG. 2 is a curve of the vibration amplitude along the length of the drive shaft; and, FIG. 3 is a curve of the noise intensities with the noise absorber located at different positions spaced every five inches along the length of the drive shaft.
Figure 3:
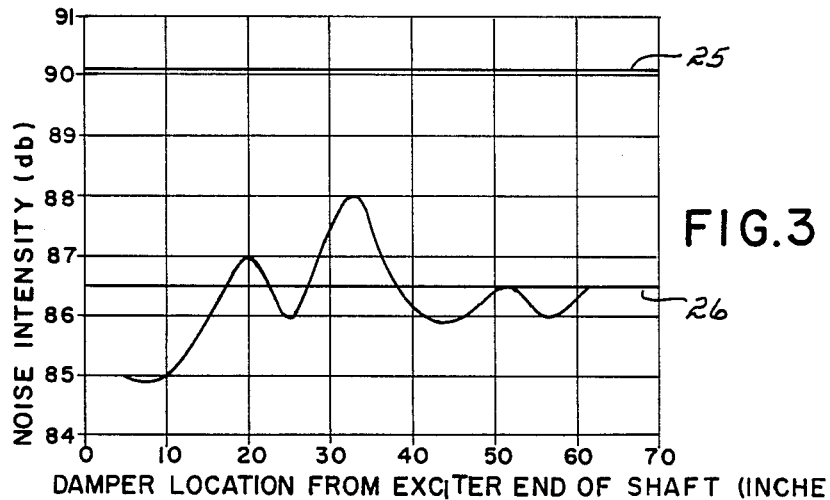

In FIG. 2, there is shown a plot of the amplitude of the vibration, as determined by an accelerometer, along the length of a drive shaft that is 66.25 inches long. FIG. 3 shows the noise intensities in decibels of the ringing drive shaft when the absorber was positioned at different locations, spaced five inches apart, along the length of the drive shaft. It can be seen that the noise was least with the absorber mounted at approximately ten inches from the left-hand end of the drive shaft as viewed in FIGS. 2 and 3. That position, it can be seen by comparing FIG. 3 to FIG. 2, corresponds to one of the positions of greatest amplitude of vibration along the length of the drive shaft.

It is believed that the curve of FIG. 2, while a measurement of the vibration of the shaft itself along its length, corresponds to the curve of the standing wave in the interior of the drive shaft, this standing wave being created by the reflection back and forth along the closed hollow tube of the sound waves. It is further believed that the greatest attenuation of the signal is obtained when the diaphragm is placed in a position corresponding to the greatest amplitude of the standing wave thereby providing the greatest effect of breaking up the standing wave.

FIG. 3 also illustrates that the noise of the drive shaft without any noise absorber 25 is at about 90 decibels and that the noise intensity of the drive shaft with the cardboard insert is at about 86.5 decibels. By the judicious positioning of the noise absorber at approximately the ten inch location from the left side of the drive shaft, the noise level is at 85 decibels which is not only significantly below that of the bare tube drive shaft but also below the level produced in a drive shaft with the cardboard insert 26. The invention thus provides as good a performance as the commercially used cardboard noise absorber and is lighter in weight and has approximately the same cost as the cardboard insert.

It is desirable to be able to insert the noise absorber into the drive shaft with a force no greater than about 500 pounds. That is possible with styrene butadiene rubber that is untreated as long as a lubricant is used. In situations where it is undesirable to use a lubricant, the surface of the rubber cup should be treated in a chlorinated bath to chlorinate its surface and thus reduce its coefficient of friction.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A noise absorber for a drive shaft comprising:
   an elastomeric ring,
   a thin diaphragm across said ring,
   means connected to said ring for strengthening said ring against radial compression of said ring.

2. A noise absorber as in claim 1 in which said strengthening means comprises:
   a plastic insert positioned within said ring,
   said ring and insert having a locking configuration resisting axial separation of said insert from said ring.

3. A noise absorber as in claim 1,
   said ring having an outer circumferential surface for engagement with said drive shaft,
   said surface being chlorinated to reduce its coefficient of friction and thereby to enable said ring to be inserted into a drive shaft without the use of a lubricant.

4. A noise absorber as in claim 1 in which said strengthening means comprises a rigid plastic insert engaging the internal surface of said ring.

5. A noise absorber for a drive shaft comprising:
   a cup-shaped rubber element having a thin diaphragm forming its bottom and a cylindrical axial wall having external and internal surfaces,
   a rigid plastic insert disposed in said cup-shaped element, said insert being circular in cross section and having an external surface contacting the internal surface of said axial wall,
   said axial wall terminating in an inwardly-directed rim,
   the external surface of said insert having a shoulder to receive said rim thereby locking said insert in said cup.

6. The combination comprising a hollow cylindrical drive shaft having an internal cylindrical surface that is closed at both ends,
   said drive shaft, when struck, producing a noise having a resonant frequency defining a standing wave within said drive shaft,
   an elastomeric noise absorber having a thin diaphragm, fixed within said drive shaft across the internal surface of said drive shaft,
   said diaphragm being fixed in said drive shaft at approximately the position of the maximum amplitude of said standing wave.

7. The combination comprising:
   a tubular drive shaft closed at both ends,
   a thin diaphragm positioned within and across the interior of the drive shaft intermediate its ends to break up the standing wave of the resonant frequency of the drive shaft,
   and means for maintaining said diaphragm at a preselected position.

8. The combination as in claim 7 in which said diaphragm is an elastomer about 0.160 inch thick.

9. The combination as in claim 7, said diaphragm terminating in an axially-extending wall that is snugly held against the interior surface of said drive shaft with about a 0.020 interference fit.

* * * * *